United States Patent
Chen

(10) Patent No.: US 11,332,637 B2
(45) Date of Patent: May 17, 2022

(54) SINGLE-COMPONENT COATING FOR AUTOMOBILE SEAL TRIP

(71) Applicant: Zhenglin Chen, Beijing (CN)

(72) Inventor: Zhenglin Chen, Beijing (CN)

(*) Notice: Subject to any disclaimer, the term of this patent is extended or adjusted under 35 U.S.C. 154(b) by 0 days.

(21) Appl. No.: 16/642,616

(22) PCT Filed: May 11, 2018

(86) PCT No.: PCT/CN2018/086447
§ 371 (c)(1),
(2) Date: Feb. 27, 2020

(87) PCT Pub. No.: WO2019/213929
PCT Pub. Date: Nov. 14, 2019

(65) Prior Publication Data
US 2021/0095158 A1    Apr. 1, 2021

(51) Int. Cl.
C09D 175/04    (2006.01)
C09D 7/65    (2018.01)
C09D 7/43    (2018.01)
C09D 7/45    (2018.01)
C09D 7/47    (2018.01)
C09D 7/63    (2018.01)

(52) U.S. Cl.
CPC ............ *C09D 175/04* (2013.01); *C09D 7/43* (2018.01); *C09D 7/45* (2018.01); *C09D 7/47* (2018.01); *C09D 7/63* (2018.01); *C09D 7/65* (2018.01)

(58) Field of Classification Search
CPC .................................................. C09D 175/04
See application file for complete search history.

(56) References Cited

U.S. PATENT DOCUMENTS

2018/0022854 A1* 1/2018 Blaisdell ............ C08G 18/4241
524/726

FOREIGN PATENT DOCUMENTS

| CN | 1281696 C | 10/2006 |
| CN | 101845267 A | 9/2010 |
| CN | 102906174 A | 1/2013 |
| CN | 105199657 A | 12/2015 |
| CN | 106497379 A | * 3/2017 |
| CN | 106833496 A | 6/2017 |
| EP | 0293084 A2 | 11/1988 |

OTHER PUBLICATIONS

Machine translation of CN 106497379 A, published Mar. 15, 2017.*
International Search Report Application No. PCT/CN2018/086447; dated Jan. 9, 2019; pp. 4.

* cited by examiner

*Primary Examiner* — Vickey Nerangis
(74) *Attorney, Agent, or Firm* — Cantor Colburn LLP

(57) ABSTRACT

The present application discloses a single-component coating for automobile seal strip, which includes one or several kinds of waterborne polyurethane resin, waterborne polyacrylate resin, waterborne epoxy resin, as well as polysilicone dispersion and sealant isocyanate curing agent. The coating of the present application is sprayed on the automobile glass guide groove, automobile door frame sponge strip, automobile trunk seal strip, automobile skylight seal strip and other rubber base materials and then baked; after the reaction, it can solve the problem of abnormal sound when the automobile is in motion, and the problem of feeling soft and smooth on the coating surface.

6 Claims, No Drawings

SINGLE-COMPONENT COATING FOR AUTOMOBILE SEAL TRIP

CROSS-REFERENCE TO RELATED APPLICATIONS

This application claims the benefit of PCT/CN2018/086447, filed May 11, 2018, which is incorporated herein by reference in its entirety.

TECHNICAL FIELD

The present disclosure relates to a technical field of automobile coating, in particular to a single-component coating for automobile seal strip.

BACKGROUND

With the increasing popularity of automobiles in China's society and families, it is of great importance to diagnose and find out the causes of mechanical faults during the use of automobiles and to deal with them properly. The occurrence of various mechanical faults will have a significant impact on driving safety and service efficiency of automobiles, and it will bring serious threats to personal and property safety of drivers and others under serious circumstances. Therefore, for maintenance personnel or drivers, it is very important to correctly analyze and diagnose the causes of automobile mechanical failure, which helps to improve the service safety and efficiency of automobiles and better meet requirements of production and life.

Sound anomaly is a common mechanical fault of automobiles. In case of this fault, an automobile driver can hear an engine making dull or sharp sound, or rubbing sound caused by other parts due to abnormal friction. These abnormal sounds sometimes occur alternately at a certain frequency or interval, or intermittently without regularity.

Statistically, about 70% of the automobile mechanical failures involve some abnormal noise. Therefore, it is practical to diagnose the mechanical faults of automobiles by listening. With the prolonged service time of the automobile and the accelerated wear of mechanical parts, the gap between the parts during brake of the automobile becomes larger, which leads to abnormal noise frequently during its operation. It can be determined by listening to the abnormal sound of the automobile whether the rotation of the automobile is balanced or not; by analyzing the characteristics of abnormal noise, such as continuity, regularity and intermittence, the location of fault can be basically judged.

Generally, abnormal sounds might occur to places such as the guide groove of the glass, door frame, trunk and skylight of the automobile. A general solution to solve the problem of abnormal sounds is to use plastic or rubber seal strip or sponge strip to fill in the gap to reduce the abnormal sounds of the automobile. However, reduction is not the same as elimination. The dynamic abnormal sounds can still occur while the automobile in motion, and a seal or sponge strip alone cannot solve the problem in a better manner.

SUMMARY

Whereas, the object of the present disclosure is to provide a single-component coating for automobile seal trip which is enabled to solve the problem of abnormal sounds occur when the automobile is in motion, and the problem of feeling soft and smooth on the coating surface.

The technical solutions adopted are given below:

A single-component coating for automobile seal strip which includes one or several kinds of waterborne polyurethane resin, waterborne polyacrylate resin, waterborne epoxy resin, as well as polysilicone dispersion and sealant isocyanate curing agent.

In the technical solution of the present disclosure, the coating in the present disclosure is single-component, and the sealed isocyanate curing agent is in a latent curing mode. One or more of waterborne polyurethane, waterborne polyacrylate and waterborne epoxy-based resin are all waterborne polymer emulsions, and a combination of the three is adopted; the polymer latex particles of the three can collaboratively conglomerate together to form a continuous resin film, and with the sealant isocyanate curing agent to be in latent curing, namely, it has certain storage stability at room temperature under a single-component system.

Polysilicone dispersion is a ultra high molecular weight organic silicone polymer which is enabled to solve the problem of feeling soft and smooth on coating surface. Polysilicone dispersion, Dow corning DC-51, for example, are available from the market. Polysilicone dispersion can reduce the friction coefficient of the coating surface, prevent adhesion, improve the anti-wear performance, and then solve the problem of feeling soft and smooth on the coating surface.

Further, the single-component coating for automobile rubber seal strip also includes a film-forming additive.

Waterborne polyurethane resin, waterborne polyacrylic acid resin and waterborne epoxy resin are all film-forming additives; after adding film-forming additives, the film forming mechanism will be improved, and the film forming quality, in addition to its adhesion and bond strength, will be significantly improved.

In order to form a film with better adhesion and bonding strength, the content ranges of the optimum weight percentages of waterborne polyurethane resin, waterborne polyacrylate resin, waterborne epoxy-base resin, polysilicone dispersion and film-forming additives are selected with experiments. The selected contents are as follows:

| | |
|---|---|
| Waterborne polyurethane resin | 25-45% |
| Waterborne polyacrylate resin | 20-30% |
| Waterborne epoxy-base resin | 15-25% |
| Polysilicone dispersion | 5-30% |
| Sealant isocyanate curing agent | 5-30% |
| Film-forming additive | 3-15%. |

Wherein, the film-forming additive is optionally dipropylene glycol butoxide.

In order to make the performance of coating more diversified and stable, coating additives can be selected to improve the performance. For example, adding one or more kinds of the wetting agent, leveling agent, dispersant, defoaming agent, organic silicone, organic fluorine, color paste, thickener, and ultraviolet absorbent. Optionally, adding all additives, namely, the single-component coating for automobile seal strip further includes a wetting agent, leveling agent, dispersant, defoaming agent, organic silicone, organic fluorine, color paste, thickener, and ultraviolet absorbent.

To make the additives work better, the respective weight percentage content ranges are adjusted with multiple experiments; optionally, the contents of the additives are as follows:

| | |
|---|---|
| Wetting agent | 0.1-2% |
| Leveling agent | 0.1-2% |
| Dispersant | 0.1-3% |
| Defoaming agent | 0.1-2% |
| Organic silicone | 0.5-5% |
| Organic fluorine | 0.1-5% |
| Color paste | 1-5% |
| Thickener | 1-3% |
| Ultraviolet absorbent | 0.1-1%. |

Undoubtedly, ultraviolet absorbent can also be replaced by antioxidant. Optionally, the organic silicone is a silicone resin or a silane coupling agent. Optionally, the organic fluorine is fluorinated olefin. Optionally, the color paste is a black paste.

A preparation method of the single-component coating for automobile seal strip, which includes the following steps:

(1) pre-dispersing organic silicone, organic fluorine powder and water according to predetermined revolutions and amounts;

(2) then, putting waterborne polyurethane resin, waterborne acrylic resin, waterborne epoxy resin and polysilicone dispersion in order in a stirring kettle, stirring and dispersing thoroughly;

(3) adding wetting agent, leveling agent, dispersant, defoaming agent, organic silicone, organic fluorine, color paste, thickener, and ultraviolet absorbent, stirring and dispersing; and (4) adding sealant isocyanate curing agent, stirring and dispersing.

When it is in use, the coating of is sprayed on the automobile glass guide groove, automobile door frame sponge strip, automobile trunk seal strip, automobile skylight seal strip and other rubber base materials and then baked; after the reaction, the abnormal sounds caused by the seal trip of automobile can be eliminated and the coating surface feels soft and smooth.

Thus, a coating is formed on the base materials of rubbers. In the coating, waterborne polyurethane resin, waterborne polyacrylate resin, waterborne epoxy resin, sealant isocyanate curing agent and film-forming additives can make the coating have abrasion resistance, weather resistance, good adhesion and bonding strength after being heated to form a film; polysilicone dispersion also makes the coating surface feeling soft and smooth.

Adding wetting agent will reduce the surface tension of base materials of rubber; adding leveling agent will increase the leveling property of coating; adding dispersant will increase the uniformity of the coating; adding defoaming agent will eliminate the bubbles produced in the stirring process; adding organic silicone will improve the abrasion resistance in the coating; and adding organic silicone will reduce the surface tension of coating; adding black paste will further improve the weather resistance of the coating; adding thickener will improve the density and viscosity of coating; and adding ultraviolet absorbents will further improve the weather resistance and stability of the coating.

The advantages of the present disclosure are as follows:

The single-composition coating for automobile seal trip of the present disclosure is sprayed on the automobile glass guide groove, automobile door frame sponge strip, automobile trunk seal strip, automobile skylight seal strip and other rubber base materials and then baked; after the reaction, testing the loudness and the test results are less than 3SONE (unit of loudness), which solves the problem of abnormal sounds caused during motion of the automobile; and the coating surface feels soft and smooth.

The single-composition coating for automobile seal trip of the present disclosure is applicable to the filed of coating on the surface of automobile rubber seal strip, which includes but not limited to automobile seal strip or sponge strip coating, automobile skylight seal strip coating and automobile trunk seal strip coating.

DETAILED DESCRIPTION OF EMBODIMENTS

The technical solution of the disclosure is further described below in conjunction with some embodiments, but the scope of protection required by the present disclosure is not limited to these.

Embodiment 1

The single-composition coating for automobile seal trip of the present embodiment, which includes the following components in percentages by weight:

| | |
|---|---|
| Waterborne polyurethane resin | 25% |
| Waterborne polyacrylate resin | 20% |
| Waterborne epoxy-base resin | 15% |
| Polysilicone dispersion | 5% |
| Sealant isocyanate curing agent | 5% |
| Film-forming additive | 3% |
| Wetting agent | 0.1% |
| Leveling agent | 0.1% |
| Dispersant | 0.1% |
| Deforming agent | 0.1% |
| Organic silicone | 0.5% |
| Organic fluorine | 0.1% |
| Color paste | 1% |
| Thickener | 1% |
| Ultraviolet absorbent | 0.1% |
| Water | remaining. |

A preparation method of the single-component coating for automobile seal strip, which includes the following steps:

(1) Pre-dispersing organic silicone, organic fluorine powder and water according to predetermined revolutions and amounts;

(2) then putting waterborne polyurethane resin, waterborne acrylic resin, waterborne epoxy resin and polysilicone dispersion in order in a stirring kettle, stirring and dispersing thoroughly;

(3) adding wetting agent, leveling agent, dispersant, defoaming agent, organic silicone, organic fluorine, color paste, thickener, and ultraviolet absorbent, stirring and dispersing; and (4) adding sealant isocyanate curing agent and remaining water, stirring and dispersing.

Embodiment 2

Refer to Embodiment 1, the single-composition coating for automobile seal trip of the present embodiment, which includes the following components and weight percentages:

| | |
|---|---|
| Waterborne polyurethane resin | 28% |
| Waterborne polyacrylate resin | 23% |
| Waterborne epoxy-base resin | 17% |
| Polysilicone dispersion | 8% |
| Sealant isocyanate curing agent | 8% |
| Film-forming additive | 5% |
| Wetting agent | 0.5% |
| Leveling agent | 0.4% |
| Dispersant | 0.4% |
| Deforming agent | 0.3% |

-continued

| | |
|---|---|
| Organic silicone | 0.5% |
| Organic fluorine | 0.4% |
| Color paste | 2% |
| Thickener | 2% |
| Ultraviolet absorbent | 0.3% |
| Water | remaining. |

Embodiment 3

Refer to Embodiment 1, the single-composition coating for automobile seal trip of the present embodiment, which comprises the following components and weight percentages:

| | |
|---|---|
| Waterborne polyurethane resin | 30% |
| Waterborne polyacrylate resin | 22% |
| Waterborne epoxy-base resin | 15% |
| Polysilicone dispersion | 6% |
| Sealant isocyanate curing agent | 9% |
| Film-forming additive | 6% |
| Wetting agent | 0.8% |
| Leveling agent | 0.7% |
| Dispersant | 0.5% |
| Defoaming agent | 0.4% |
| Organic silicone | 0.4% |
| Organic fluorine | 0.6% |
| Color paste | 0.7% |
| Thickener | 1% |
| Ultraviolet absorbent | 0.2% |
| Water | remaining. |

The single-composition coating for automobile seal trip obtained from any of embodiments 1-3 is sprayed on rubber base material of the automobile door frame sponge strip, after the reaction, testing the loudness of the automobile in motion, and the test results are less than 3SONE (unit of loudness), which solves the problem of abnormal sounds caused in the automobile in motion; and the coating surface feels soft and smooth.

What is claimed is:

1. A single-component coating composition for automobile seal strip, comprising the following components by weight percentage:

| | |
|---|---|
| Waterborne polyurethane resin | 25-45%, |
| Waterborne polyacrylic resin | 20-30%, |
| Waterborne epoxy resin | 15-25%, |
| Polysilicone dispersion | 5-30%, |
| Blocked isocyanate curing agent | 5-30%, |
| Film-forming additive | 3-15%, |
| Wetting agent | 0.1-2%, |
| Leveling agent | 0.1-2%, |
| Dispersant | 0.1-3%, |
| Defoaming agent | 0.1-2%, |
| Organic silicone | 0.5-5%, |
| Organic fluorine | 0.1-5%, |
| Color paste | 1-5%, |
| Thickener | 1-3%, and |
| Ultraviolet absorbent | 0.1-1%. |

2. The single-component coating composition for automobile seal strip according to claim 1, wherein the film-forming additive is dipropylene glycol butyl ether.

3. The single-component coating composition for automobile seal strip according to claim 1, wherein the organic silicone is silicone resin.

4. The single-component coating composition for automobile seal strip according to claim 1, wherein the organic fluorine is a fluorine-containing olefin.

5. The single-component coating composition for automobile seal strip according to claim 1, wherein the color paste is a black paste.

6. The single-component coating composition for automobile seal strip according to claim 1, wherein the defoaming agent is organic silicon defoaming agent or mineral oil defoaming agent.

* * * * *